G. W. BOWEN.
PROCESS OF MAKING A COMBINED BOLT AND GREASE CUP FROM SHEET METAL BLANKS.
APPLICATION FILED NOV. 6, 1911.
1,054,669.
Patented Mar. 4, 1913.
4 SHEETS—SHEET 1.
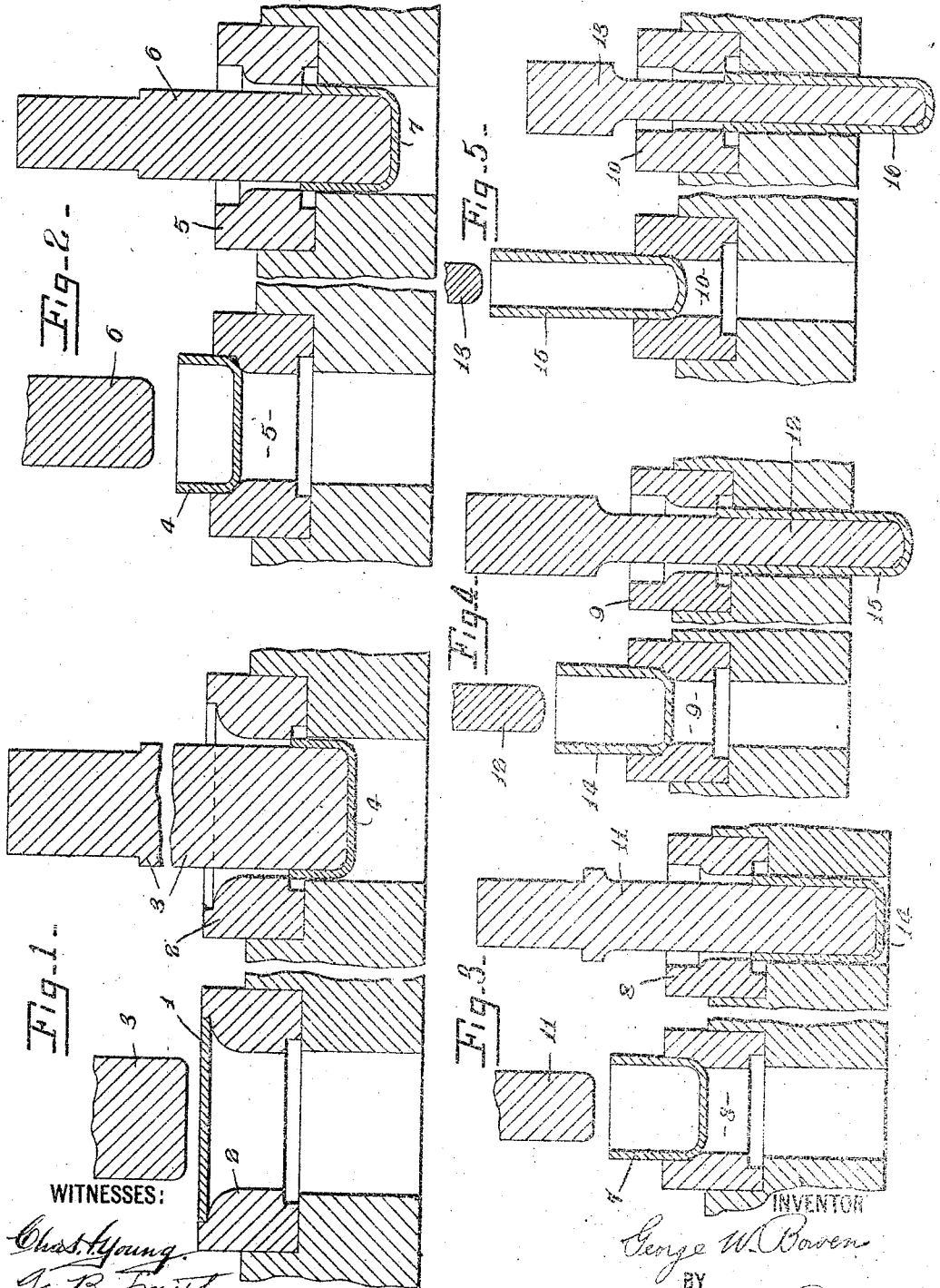

G. W. BOWEN.
PROCESS OF MAKING A COMBINED BOLT AND GREASE CUP FROM SHEET METAL BLANKS.
APPLICATION FILED NOV. 5, 1911.
1,054,669.
Patented Mar. 4, 1913.
4 SHEETS—SHEET 2.
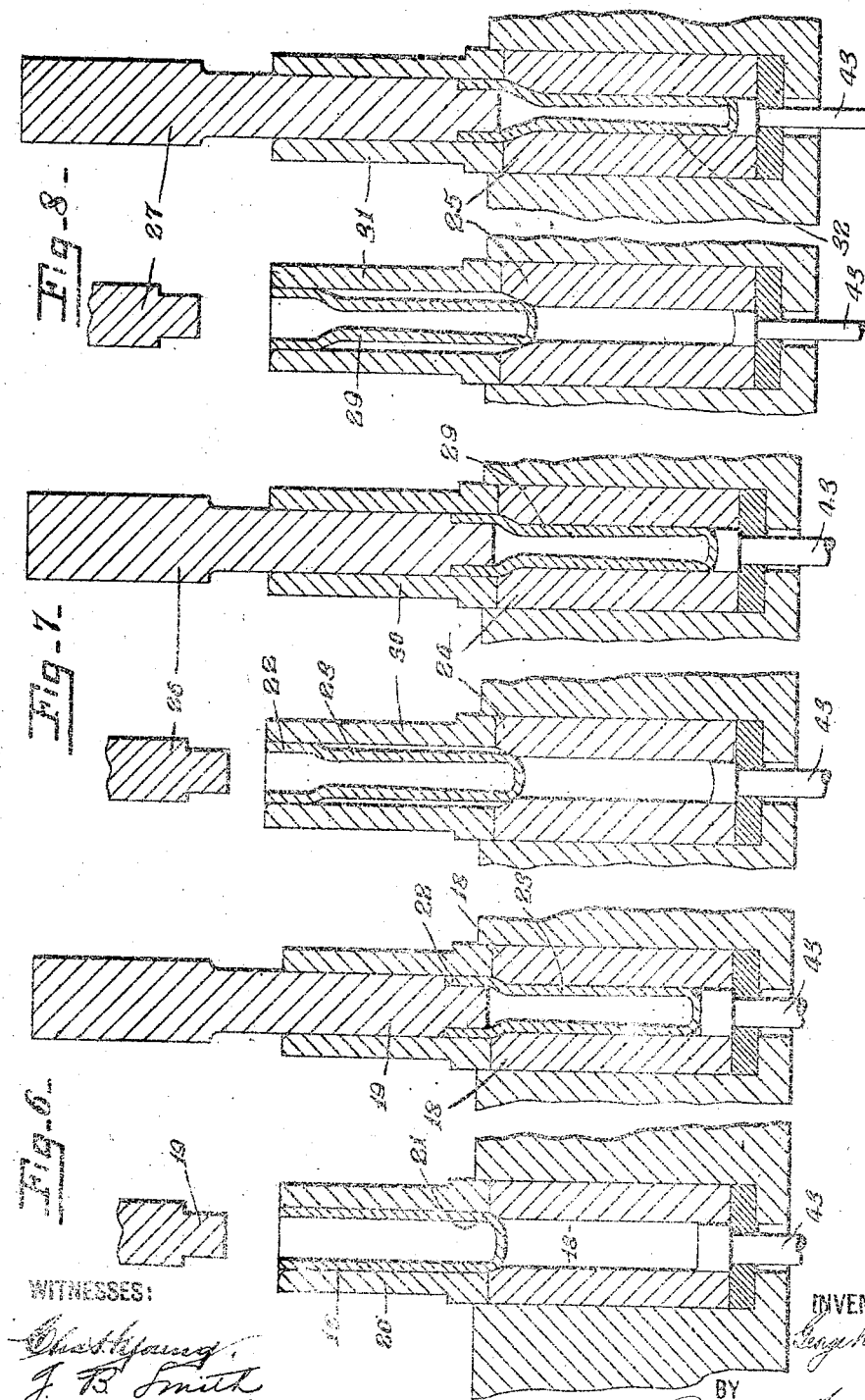

G. W. BOWEN.
PROCESS OF MAKING A COMBINED BOLT AND GREASE CUP FROM SHEET METAL BLANKS.
APPLICATION FILED NOV. 6, 1911.
1,054,669.
Patented Mar. 4, 1913.
4 SHEETS—SHEET 3.
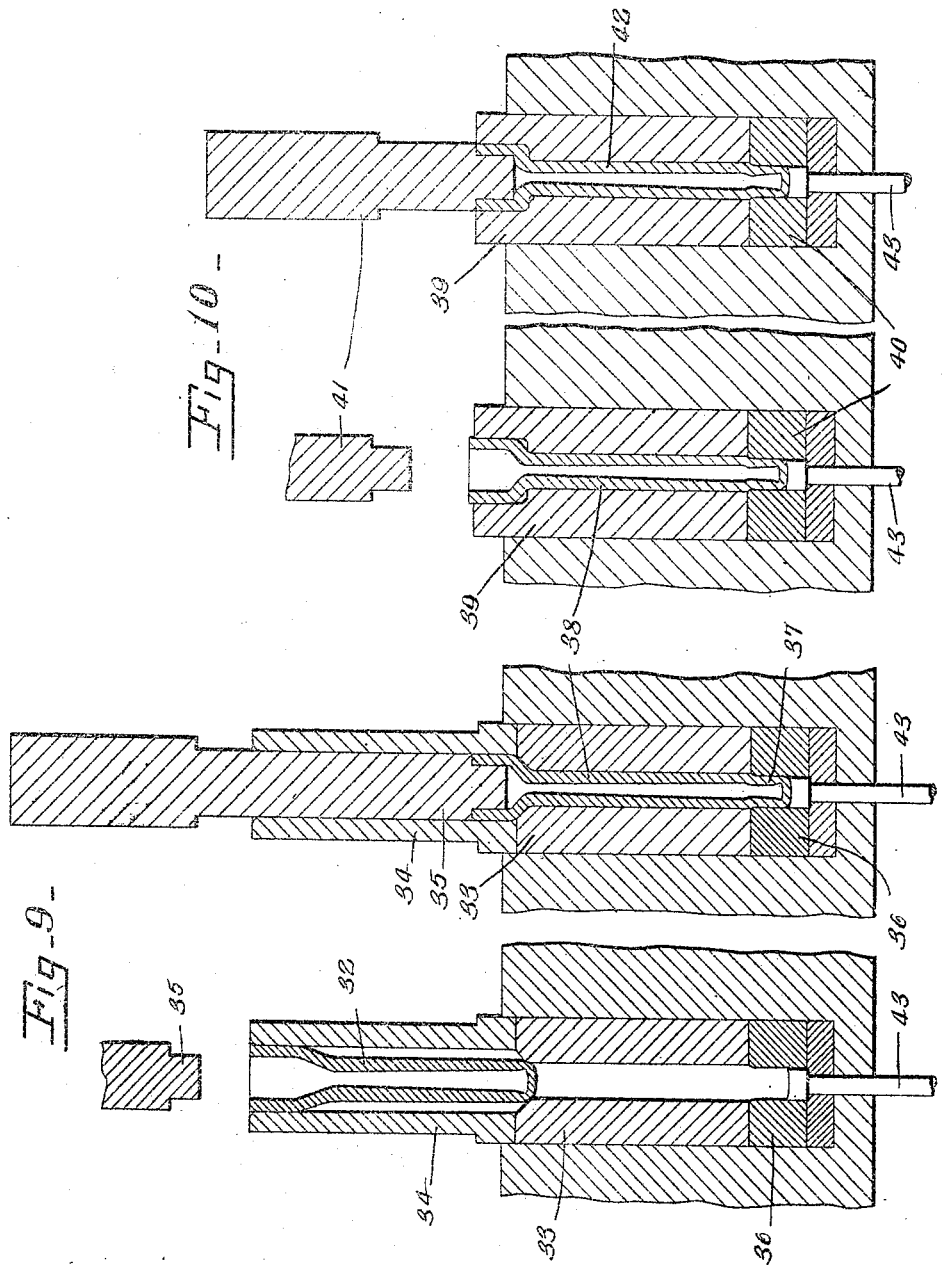
WITNESSES:
INVENTOR
George W. Bowen
BY
Parsons Hart Bodell
ATTORNEYS G. W. BOWEN.
PROCESS OF MAKING A COMBINED BOLT AND GREASE CUP FROM SHEET METAL BLANKS.
APPLICATION FILED NOV. 6, 1911.
1,054,669.
Patented Mar. 4, 1913.
4 SHEETS—SHEET 4.
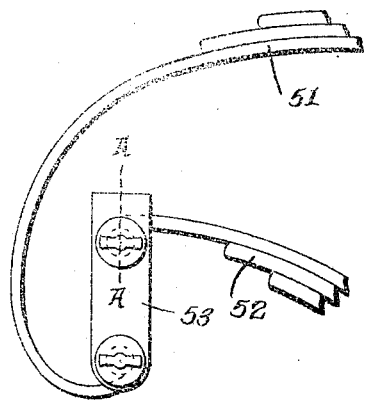
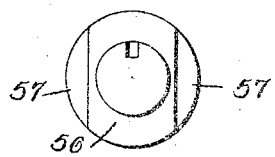
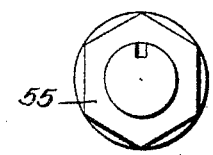
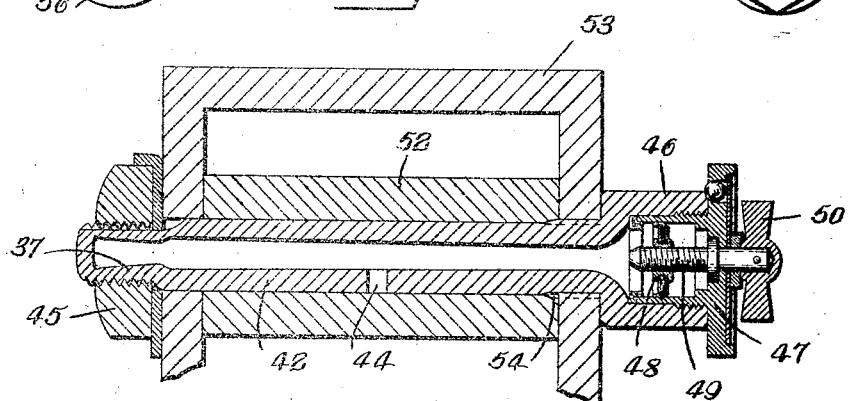
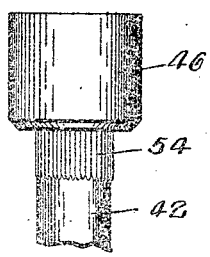
WITNESSES:
Chas H Young
J. B. Smith
INVENTOR
George W. Bowen
BY
Parsons Hall & Bodell
ATTORNEYS

//BEST AVAILABLE COPY

UNITED STATES PATENT OFFICE.

GEORGE W. BOWEN, OF AUBURN, NEW YORK

PROCESS OF MAKING A COMBINED BOLT AND GREASE-CUP FROM SHEET-METAL BLANKS.

1,054,669. Specification of Letters Patent. Patented Mar. 4, 1913.

Application filed November 6, 1911. Serial No. 658,799.

*To all whom it may concern:*

Be it known that I, GEORGE W. BOWEN, of Auburn, in the county of Cayuga and State of New York, have invented a new and useful Process of Making a Combined Bolt and Grease-Cup from Sheet-Metal Blanks, of which the following is a specification.

This invention has for its object a process of producing a combined hollow sheet metal bolt and grease cup which is particularly applicable for use as a spring bolt, that is, a bolt for connecting the leaf springs of a vehicle to a link or to another leaf spring; and it consists in the process or method of forming such combined bolt and grease cup as hereinafter set forth and claimed.

In describing this invention reference is had to the accompanying drawings in which like characters designate corresponding parts in all the views.

Figures 1, 2, 3, 4 and 5 are vertical sectional views of the tools, and blanks being operated on, illustrating the drawing operations by which a tube closed at one end is formed; Figs. 6, 7 and 8 are similar views illustrating the reducing and strengthening or toughening operations and also the head forming operations; Figs. 9 and 10 are vertical sections illustrating further reducing and forming operations, each of the sections containing two views illustrating the beginning and the end of the operation. Fig. 11 is a fragmentary view of a spring and shackle showing one use for this sheet metal bolt and grease cup. Fig. 12 is an enlarged sectional view on line "A—A", Fig. 11. Fig. 13 is a fragmentary view of the bolt seen in Fig. 12, showing one end thereof in elevation. Figs. 14 and 15 are detail views of slightly modified forms of bolts.

This process for forming hollow elongated sheet metal bolts includes as one of its steps decreasing the diameter of a tubular blank by pushing the blank, which is closed at one end, into a cylindrical reducing die by applying pressure to the edge of the open end of the tubular blank and thereby thickening and compressing the wall of the resultant tubular article, as the blank is forced into the die, and supporting the tubular blank externally prior to its entrance into the cylindrical reducing die, in order to accurately guide the blank into the die and prevent buckling of the blank.

In the first step of my process the tubular blank is formed from a disk of sheet metal into a cup-shaped blank, and in the second step this cup-shaped blank is drawn out into a tube by forcing the cup-shaped blank into a reducing die by a punch bearing against the inner face of the bottom of the cup-shaped blank, and repeating the drawing operations in successive reducing dies until an elongated tube is formed which is closed at one end, and is of a length somewhat shorter than the required length of the finished bolt. Usually the bolt is formed with a cup-shaped head at one end and with a thread receiving nipple at its other end of less diameter than the major part of the bolt. The cup-shaped head is formed by removing the pressure from the upper edge of the tubular blank before the blank is pushed to its full extent into the reducing die, the supporting die forming an enlargement at the upper or outer end of the cylindrical die; and the thread receiving nipple is formed by further reducing the diameter of the advance or lower closed end of the tube, as the tube approaches the limit of its movement into the die during the pushing operations. Preferably the dies for use in the pushing operations are provided with knock-out pins at their lower or inner ends, which serve as abutments against which the closed ends of the tubes are pressed. The abutments cause the metal to flow backwardly and further thicken and toughen the barrel portions of the tubes, said abutments also determine with accuracy, the length of the bolt.

In carrying out this process I usually employ the steps illustrated in Figs. 1 to 10 inclusive. In some cases, however, some of the steps may be omitted. In Fig. 1, 1 is a sheet metal blank, and 2 is a reducing die; 3 is a punch for engaging the intermediate part of the sheet metal disk 1, and forcing the disk into the reducing die forming a cup-shaped blank or shell 4. The cup-shaped blank 4 is then placed into a cylindrical reducing die 5 and further drawn out by a punch 6 bearing on the inner face of the bottom of the cup-shaped blank 4, forming the tubular blank 7. The drawing operations are repeated in successive cylindrical reducing dies 8, 9 and 10, Figs. 3, 4 and 5, with which punches 11, 12 and 13 coöperate to form the tubular blanks 14, 15 and 16 respectively, these drawing operations being repeated until the resultant tubular blank 16 is somewhat shorter than the length of the required article. In working some metals, and in bolts of different sizes, the number of drawing operations may be varied as the nature of the work requires. As seen in Fig. 6, the tubular blank 16 resulting from the last drawing operation, is subjected to a pushing operation by being forced into a reducing die 18 by a punch 19 bearing on the upper edge of the tube 16, the die 18 being surmounted by a supporting die 20 of the same internal diameter as the external diameter of the tubular blank 16, the die 20 supporting the blank 16 externally to guide the blank into the reducing die and prevent buckling of the tubular blank 16. The lower end of the supporting die forms an enlarged cavity 21 at the upper or outer end of the reducing die, by means of which an enlargement or cup-shaped head 22 is formed on the resultant tubular blank 23. Preferably the punch 19 is provided with a portion which extends into, and engages, the inner face of the walls of said enlargement and also causes the walls below said enlargement to be thickened, compressed and therefore toughened. The pushing operations may be repeated until a tube of the required length and thickness is formed. As seen in Figs. 7 and 8, additional successive pushing operations are shown, and in Figs. 7 and 8, 24 and 25 are reducing dies; 26 and 27 are punches cooperating therewith and bearing on the upper edges of the blanks 23 and 29 respectively, in the same manner that the punch 19 engages the upper edge of the blank 16. 30 and 31 are the supporting dies which engage only the cup-shaped enlargement. The last of the pushing operations results in the tube 32. The tube 32 is subjected to a similar pushing operation, as shown in Fig. 9, for forming a thread receiving nipple at the lower end of the tube, and also for perfecting the enlargement or cup-shaped head. This pushing operation is effected by the reducing and supporting dies 33, 34 and punch 35 similar to the dies and punches shown in Figs. 6, 7 and 8, and the die 33 is formed with an additional reducing portion 36 at its bottom for forming a thread receiving nipple 37 in the resultant tube 38. The tube 38 may be subjected to additional pushing and reducing operations for the purpose of perfecting the article, as illustrated in Fig. 10, in which 39, 40 are the dies and 41 is the punch acting on the tube 38. These additional pushing or finishing operations upset the part of the shell forming the bottom of the head and reduce in diameter a part of the shell in the vicinity of its closed end by pressure applied to the interior of the shell in the vicinity of the bottom of the head and to the open end of the shell. Such additional pushing or finishing operations result in the bolt 42 which is substantially the form of the finished article the body portion of the bolt being usually at least three times the length of the head. In the pushing operations shown in Figs. 6 to 10 inclusive, the dies are provided with abutments or knock-out pins 43. The bolt 42 is case hardened, and perforated as at 44, Fig. 12, the nipple 37 thereof threaded for receiving a nut 45, and the enlarged cup-shaped head 46 is suitably threaded for receiving a cap or closure 47. The cap or closure may be of any suitable form, size and construction and is shown as threading into said cup-shaped head, and as provided with means as a follower or plunger 48 movable therein for forcing the grease into the bolt and out through the perforation 44. This plunger 48 as here shown is operated by a screw 49 extending through a threaded opening in the plunger, the screw being held from endwise movement and having a handle 50 located outside of the closure.

In Figs. 11 and 12 I have shown one use for my sheet metal bolt in which two of my bolts are shown as connecting leaf springs 51 and 52 to a shackle or link 53. In order to prevent the bolt from turning the bolt may be formed with corrugations 54 adjacent the head, Figs. 12, and 13, or the head thereof may be formed with a non-circular portion which fits a complemental socket in the link or shackle. As seen in Fig. 14 the head may be formed with a hexagonal base 55 which fits a complementary shaped socket in the link, or as seen in Fig. 15 with a transversely extending tenon 56 formed by cutting away opposite portions of the bottom of the head as at 57 along parallel chords, which tenon fits a complemental groove in the link. These corrugations or the non-circular bases of the heads may be formed with dies during the formation of the bolt or may be afterward cut by machine tools. However, the use of my bolt is not limited to springs, but obviously the bolt may be used in other situations as for instance as the bearings for the pulleys of pulley blocks, or for wheels as idlers of agricultural and other machinery, and trolley wheels, etc.

Heretofore spring bolts have been formed by boring out a solid bolt and attaching a grease cup thereto, and by my process a radically new article, such as that shown in Fig. 12, is formed for which a divisional application will be made.

What I claim is:

1. The hereinbefore described process of forming from sheet metal the described article having a hollow head and a body portion provided with an axial bore closed at one end and opening at its other end into the head, the body portion being of less diameter and of greater length than the head, consisting in the following steps; (1) drawing the flat blank into a cup-shaped shell; (2) elongating and reducing the diameter of the shell to the maximum diameter of the finished article by forcing the shell successively into dies of gradual decreasing diameters by pressure applied to the inner closed end of the shell; and (3) further elongating, decreasing in diameter and thickening the wall of the part of the shell which is to form the body of the article, and the part which is to form the bottom wall of the head, while maintaining substantially at the diameter resulting from step 2 the part of the shell which is to form the side wall of the head, by successively pressing the part of the shell to be reshaped into a plurality of dies of gradually decreasing diameters by pressure applied to the edge of the shell at its open end, substantially as and for the purpose described.

2. The hereinbefore described process of forming from sheet metal the described article having a hollow head with a substantially flat bottom wall and a body portion provided with an axial bore closed at one end and opening at its other end into the head and having a portion in the vicinity of its closed end of less diameter than the major portion thereof, consisting in the steps as follows: (1) drawing a flat blank into a cup-shaped shell; (2) elongating and reducing the diameter of the shell to the maximum diameter of the finished article by forcing the shell successively into a plurality of dies of gradually decreasing diameters by pressure applied to the inner closed end of the shell; (3) further elongating, decreasing in diameter and thickening the wall of the shell forming the body part of the article, and the part forming the bottom of the head, while maintaining substantially at its original diameter resulting from step 2, the part of the shell forming the side wall of the head, by successively pressing the part of the shell to be reshaped into a plurality of dies of gradually decreasing diameters by pressure applied to the edge of the shell at its open end; and (4) finally upsetting the part of the shell forming the bottom of the head and reducing in diameter a part of the shell in the vicinity of its closed end, by forcing the shell into a die having a part conforming to the shape of the finished head of the article, a part of the diameter of the major part of the body of the article and a part of reduced diameter, by pressure applied to the interior of the shell in the vicinity of the bottom of the head and to the open end of the shell.

In testimony whereof, I have hereunto signed my name in the presence of two attesting witnesses, at Syracuse, in the county of Onondaga, in the State of New York, this 20th day of October, 1911.

GEORGE W. BOWEN.

Witnesses:
S. DAVIS,
L. M. DAVIS.